Figure 1:
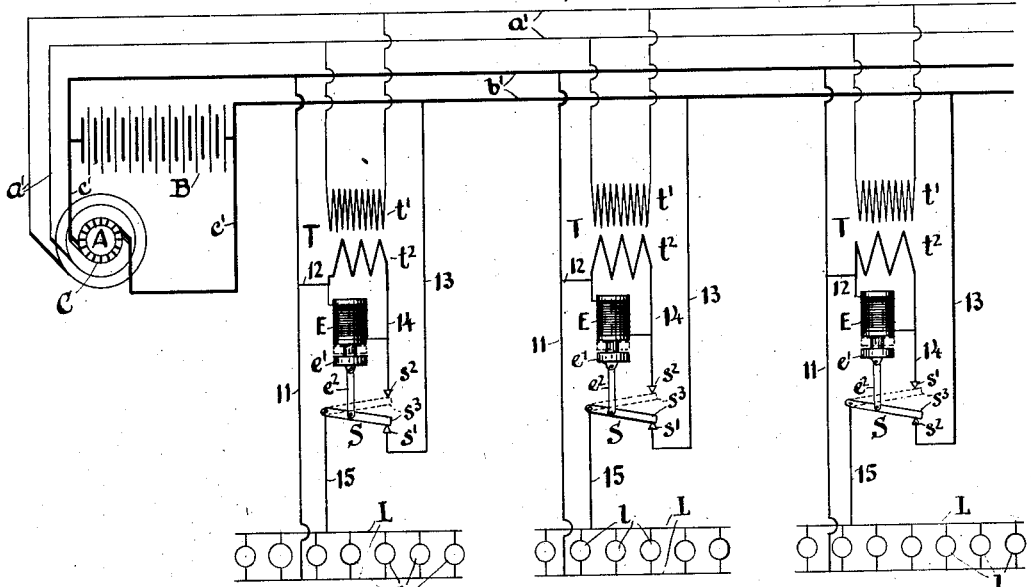

J. H. GUGLER & G. W. COLLES.
COMBINED ALTERNATING AND DIRECT CURRENT DISTRIBUTING SYSTEM.
APPLICATION FILED FEB. 8, 1911.

1,169,537.

Patented Jan. 25, 1916.
3 SHEETS—SHEET 1.

UNITED STATES PATENT OFFICE.

JULIUS H. GUGLER AND GEORGE W. COLLES, OF MILWAUKEE, WISCONSIN; SAID COLLES ASSIGNOR TO SAID GUGLER.

COMBINED ALTERNATING AND DIRECT CURRENT DISTRIBUTING SYSTEM.

1,169,537. Specification of Letters Patent. Patented Jan. 25, 1916.

Application filed February 8, 1911. Serial No. 607,323.

*To all whom it may concern:*

Be it known that we, JULIUS H. GUGLER and GEORGE W. COLLES, of Milwaukee, Wisconsin, have invented a Combined Alternating and Direct Current Distributing System, of which the following is a specification.

This invention relates more particularly to line-service served by an alternating-current circuit during most of the time, and provided with a storage-battery to be used during the remainder of the time; and it has for its object to provide means for automatically causing the direct current to be turned on to the lighting-system whenever the alternating-current is discontinued, and turned off again when the alternating-current is turned on, without manual attention.

In many small towns and villages, especially those where service is to individual houses widely scattered, the high-tension alternating-current distribution is used, the current being provided direct from a generator. In such systems the amount of current used during the night is so small that it does not pay to keep the generator running all night to accommodate it. In order now to provide 24-hour service upon such systems without the necessity of keeping the station running all night, a storage-battery is provided at the station, and a direct-current line-circuit leading therefrom in addition and parallel to the alternating-current circuit from the generator. As the amount of current required during the hours in which the storage-battery is used is very small, the line loss is negligible for this period even for long distances. Branch-circuit wires are run from the direct-current circuit to the individual house-systems, or wherever there is a transformer providing for such a branch-system; and it is in such case necessary to provide means for switching on the direct-current whenever the alternating-current is off, and such means must be so devised that in no case can both systems be turned on the service wires at once.

It is the object of this invention to provide such means, and moreover to provide for performing the switching-action automatically as hereinabove stated, the actuating force for the switch proceeding from the alternating-current circuit.

In general we provide an electromagnetic device which is actuated directly or indirectly from the secondary of each transformer, said electromagnetic device being caused to be energized whenever there is an electromotive force applied to the transformer, and thereby to move the change-over-switch to the alternating-current side; and conversely when current ceases in the transformer-secondary, to move said switch to the opposite or direct-current side. In a more improved form of our invention we provide further interlocking-means to prevent any short-circuit which would occur were some of the electromagnetic-devices to fail to act; in case the branch lighting-system should be connected together as is customary for purposes of regulation.

Further improvements and combinations will be hereinafter described and detailed, and are particularly set forth in our claims.

Figure 2:
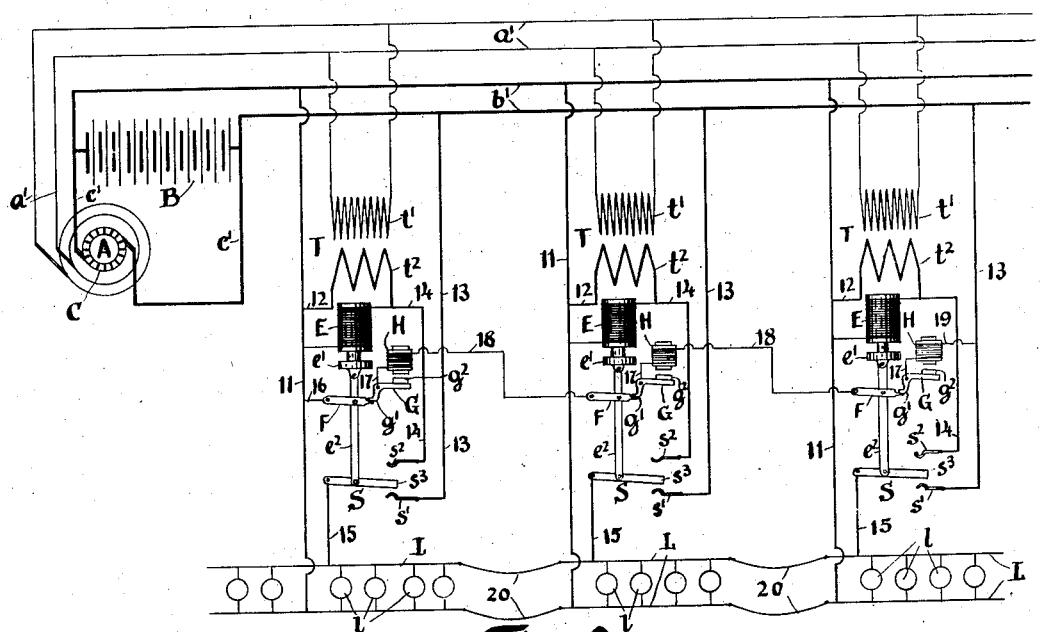
Figure 3:
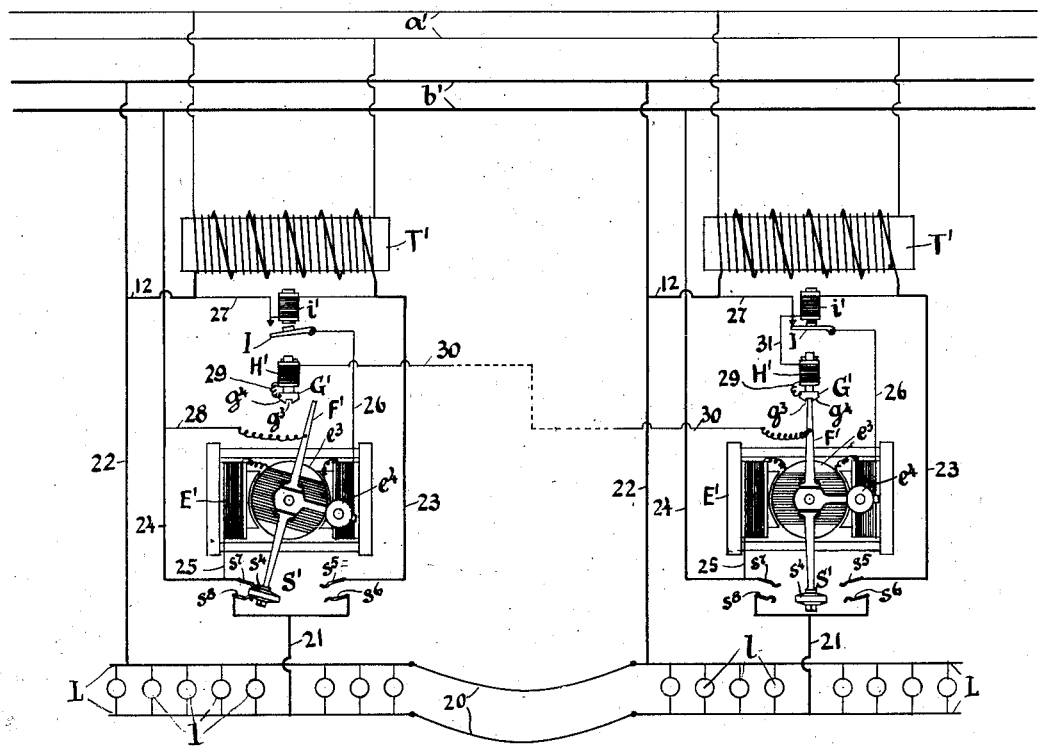
Figure 4:
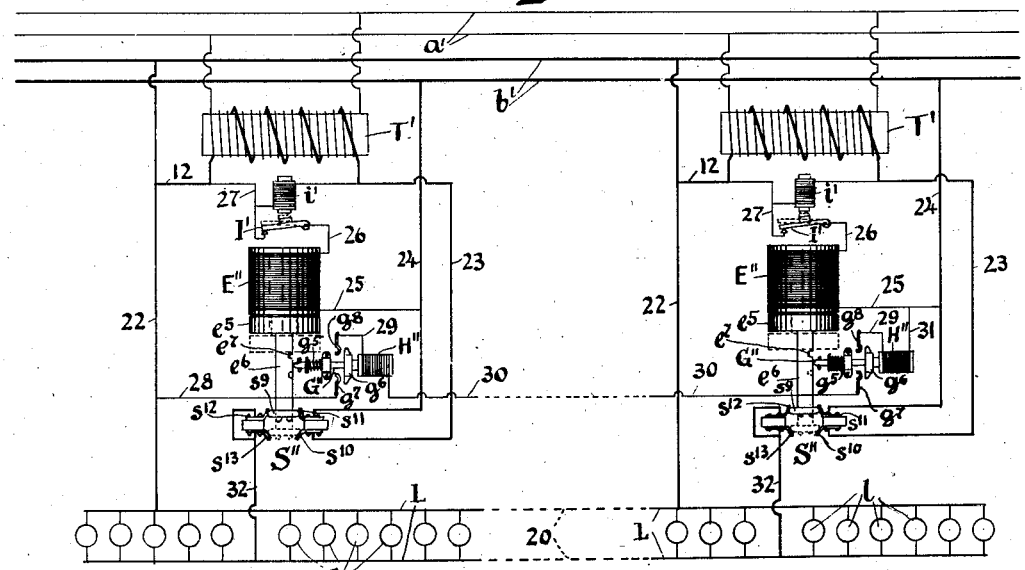
Figure 5:
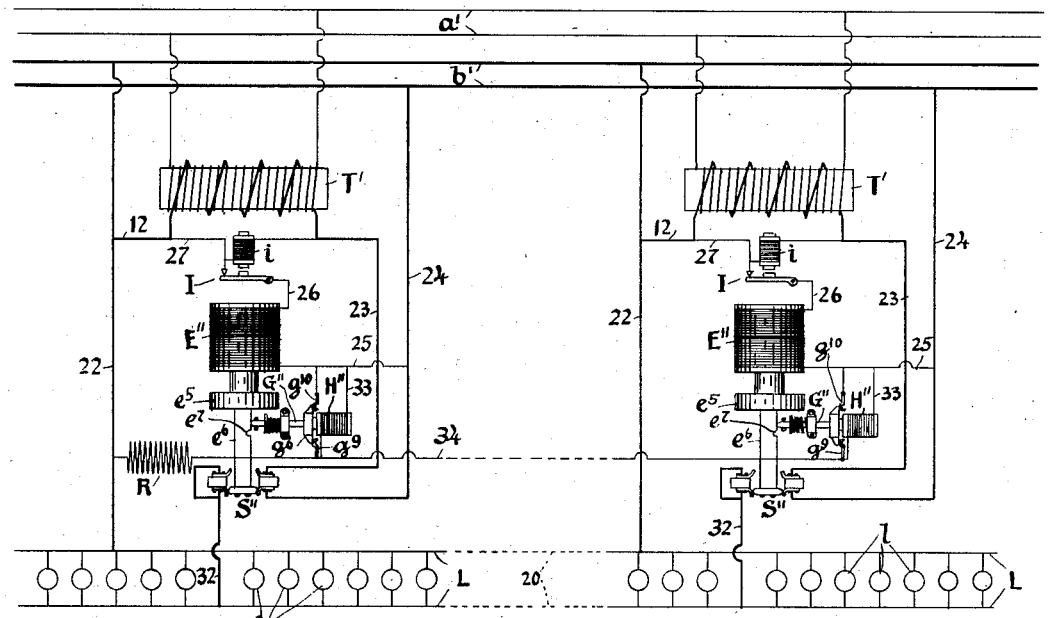
Figure 6:
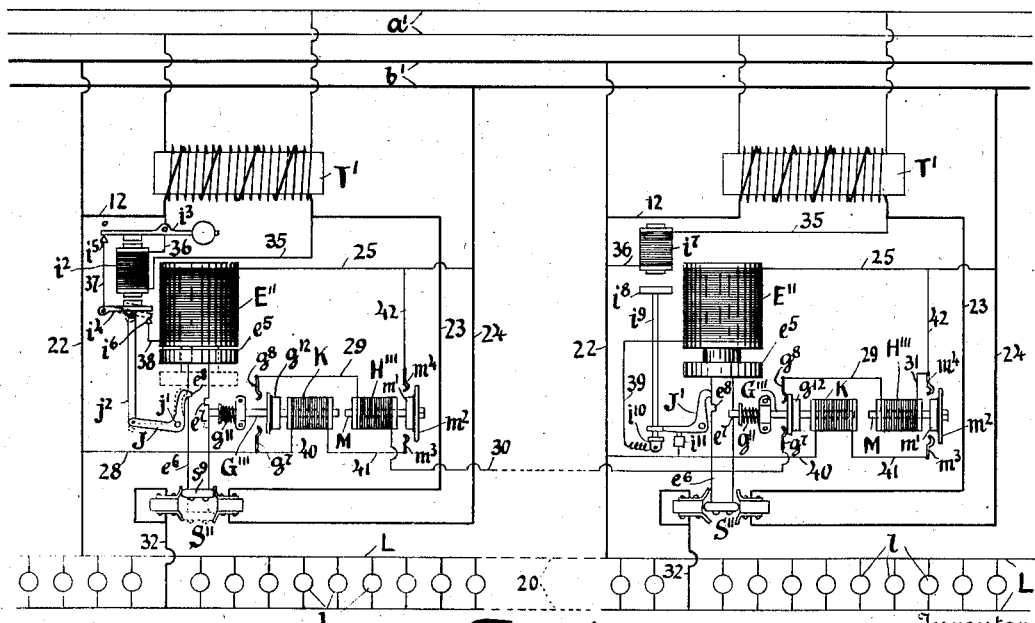

For the better understanding of our invention, we have illustrated in the accompanying drawings several embodiments of our invention, some being more improved and elaborate than others; and in these drawings Figure 1 is a diagram of a complete alternating-current lighting-system having three branches and showing the simplest form of our automatic switching devices; Fig. 2 is a similar view with the addition of a simple interlocking-device; Fig. 3 shows a system provided with an improved form of interlocking device and a different form of electromagnetic-switch; Fig. 4 illustrates an alternative form operating on the same principles as that shown in Fig. 3; Fig. 5 illustrates a system in which the general arrangement and elements are the same as in Fig. 4, but the interlocking-devices are connected in parallel instead of in series; and Fig. 6 illustrates especially a means whereby the electromagnetic-switch may be maintained in its raised position without the necessity of keeping it energized; and showing also further improvements in the interlocking-devices whereby the positive operation of each interlocking-device individually is insured.

The reference letters refer each to the same part in each figure of the drawings.

Considering first Fig. 1, the letter A denotes an alternating-current generator supplying line-wires $a'$ with alternating-current at a high potential, and the letter B designates a storage-battery or other means for supplying direct-current to the direct-current line-wires $b'$. The battery B may be, and commonly is, charged from a rectifier or direct-current dynamo attached to the generator A, and represented herein by a commutator C, from which direct current is taken by the leads $c'$ in the usual manner. At various places along the line transformers T are installed, the coil $t'$ representing the primary coil, and the coil $t^2$ the secondary coil of each of said transformers. The lighting-systems L which carry the lights $l$, and which in this case are shown disconnected from each other, are served alternatively from the circuit $b'$ or the transformer-secondary $t^2$ as will be presently seen. To this end a common wire 11 is run from one of the wires $b'$ (the same wire for each of the branch lighting-circuits) and permanently connected to one side of the corresponding lighting-system, and one side of the transformer-secondary $t^2$ connected thereto by a wire 12. A third wire 13 is run from the other line-wire $b'$ to one terminal $s'$ of the changeover-switch S, and a fourth wire 14 is run from the other side of the secondary $t^2$ to the opposite terminal $s^2$ of the switch. The side of the lighting-system L opposite that to which the wire 11 is connected is permanently connected by a lead 15 to the switch-blade $s^3$, so that this side of the lighting-system may be connected either with the direct-current or alternating-current circuit according to its position. The switch S is actuated by the armature $e'$ of an electromagnet or solenoid E, being connected thereto by a link $e^2$ or other suitable mechanical connection. The electromagnet or solenoid E is as shown connected directly across the terminals of the secondary $t^2$ of the transformer so that whenever the alternating-current comes into the secondary, the electromagnet E is energized and raises its armature and switch-blade $s^3$, and moves the latter into the dotted-line position, whereby the lighting-circuit L is connected to and supplied from the transformer. This condition will remain as long as there is an alternating-current on the line, and when it is discontinued the electromagnet E being no longer energized will drop its core and thereby throw over the switch S to the direct-current side, so that each branch lighting-system is now supplied with current from the battery B. If the parts are all in good working order, the change will of course takes place on all the branch-circuits at once.

In Fig. 1 the branch lighting-systems are shown as disconnected from each other; but it is customary for better regulation and economy of transformer capacity to connect the secondaries of neighboring circuits together. Should this be done, and should the apparatus be as shown in Fig. 1, then if any derangement occurs to one of the electromagnetic-switches, so that it fails to act, and one or more of the others do act, there will be a short-circuit of the direct-current circuit through one or more of the transformer-secondaries. To prevent this from taking place, we introduce an interlocking-system between the several electromagnetic switches, a simple form of which is illustrated in Fig. 2. In this figure the construction is as already described in Fig. 1 with the following additions: The lighting circuits L are connected together by line-wires 20. A pivoted bar F is connected to the link $e^2$, its free end extending beyond the latter, and being in position for engagement with a trip $g'$ on the end of a trip-lever G, upon which is mounted the armature $g^2$ of an electromagnet or solenoid H. The bar F and lever G are of electrically conducting material, and the bars F, levers G, and electromagnets H, of all the interlocking-devices are so connected together that when the bars F are in contact with their respective levers G, they are all in series and in circuit across the battery-mains. In other words, the bar F of the interlocking-device at one end of the series is permanently connected by a lead 16 to one side of the direct-current circuit, as to the lead 11; the corresponding lever G is connected by a lead 17 to one terminal of the corresponding electromagnet or solenoid H; the other terminal of the latter is connected by a lead 18 to the bar F of the next interlocking-device in the series; and so on until the last one is reached, the terminal of the last electromagnet H being connected directly to the opposite side of the battery, as for example to the lead 13. The arrangement of the end of the bar F in relation to the trip $g'$ is such that the two can be in contact only when the switch-lever $s^3$ is out of contact with both the electrodes $s'$ and $s^2$, and lies between them as shown in the drawing. In this position the interlocking-circuits 16, F, G, 17, H, 18 ... H, 19 will be complete, and in such condition the electromagnets H will attract their armatures $g^2$ and remove the trips $g'$ from the paths of the bars F, thereby enabling the latter and the switch-levers $s^3$ to complete their travel in one direction or the other. Now it will be clear that should any one of the electromagnets E fail to act, the bar F belonging to that electromagnet will not come into contact with its corresponding trip-lever G, and thereby the interlocking-circuit will not be completed, and therefore none of the switches S can be thrown, and therefore the short-circuit hereinabove indicated cannot take place. This will be the case, no matter whether the throw is in the upward or the downward direction.

While the arrangement just described provides against an immediate short-circuit due to failure of one of the electromagnetic-devices E to act, yet another contingency is introduced through the possible failure of one of the interlocking-magnets H to withdraw in time to release the corresponding bar F. In this case the bar F of the interlocking device so failing to act would of course be held either by gravity or by attraction of the electromagnet E against the trip $g'$ and for the time being there would be no short-circuit, but the lights on that branch would be cut off. If this is discovered and remedied before a reverse-change from alternating to direct or direct to alternating takes place all will be well, but if not discovered or remedied before such reverse-change takes place, then when said reverse change takes place, the switch-lever S of the branch where the interlock has failed to act will immediately drop back to its original position without regard to the interlock, and all the other switches will be held by the trips because the interlocking-circuit cannot be closed; and this will therefore throw all the other branches out of service, or should any of the electromagnetic switches of said branches fail to operate, it will remain on the opposite side from the one where the interlock has failed to operate, and thus cause a short-circuit. To provide against such a contingency, we may employ a form of interlocking-device with double trip, one form of which is illustrated in Fig. 3. In this figure we have somewhat varied the symbolic constructions shown in Figs. 1 and 2, to illustrate the varying forms under which our invention may be embodied. The alternating- and direct-current line wires $a'$ and $b'$, the lighting-circuit L and lamps $l$, are as heretofore, the transformer being designated T', and the electromagnetic-device E'. The latter is shown in motor-form with a shuttle-wound cylindrical armature $e^3$, adapted to rotate through a certain angle sufficient to operate the switch S', which consists of a contact-member $s^4$ adapted to close the circuit between the terminals $s^5$ and $s^6$, or $s^7$ and $s^8$. The terminals $s^6$ and $s^8$ are connected by a lead 21 to one side of the lamp-circuit L; one side of the transformer-secondary and one side of the battery-circuit are connected by a common lead 22 to the other side of the lamp-circuit L, the other side of the transformer-secondary is connected by a lead 23 to terminal $s^5$; and the other side of the battery is connected by a lead 24 to the terminals $s^7$. The electromagnetic-device E' is connected by a circuit comprising the leads 25, 26 and 27 across the battery-circuit, but between the leads 26 and 27 is interposed a make-and-break device I operated by an electromagnetic-device $i'$, which is connected across the terminals of the secondary transformer circuit as shown. This arrangement is more efficient than that heretofore described, and the electromagnetic-device $i'$ which is operated by the alternating-current need be only very small. When the alternating-current comes on, the make-and-break I is closed, thus closing the circuit of the electromagnetic-device E', and turning the armature $e^3$ to the left, and thus connecting the terminals $s^5$ and $s^6$, and closing the lamp-circuit through the transformer-secondary. When the alternating-current goes off, the make-and-break I is opened, the electromagnetic-device E' releases its armature, and the latter is turned by a counter-balance $e^4$ into the opposite position, closing the lamp-circuit across the direct-current circuit through the terminals $s^7$ and $s^8$. The interlocking-device comprises the bar F' which turns with the armature $e^3$; the locking-piece G', which has a central notch $g^3$ of proper form to fit over the end of the bar F'; and an electromagnet H'. The locking-piece G' acts as the armature of the electromagnet H' and also as the contact-piece to make electric contact with the bar F', and it has oblique cam-faces $g^4$ on its sides whereby the end of the bar F' raises it as said bar swings over, and thus the bar becomes caught and locked in the notch $g^3$. In this position it cannot move in either direction until the magnet H' is energized, so as to withdraw the locking-piece G from engagement therewith. The connections by which this is performed are the same as before, to wit: a lead 28 permanently connecting one side of the battery-circuit with the first bar F' of the series; a lead 29 connecting the armature G' with the electromagnet H'; a lead 30 connecting the latter with the next bar F' of the series; and so on to the last electromagnet H', which is connected by a lead 31 to the other terminal of the battery-circuit. From this arrangement it will be clear that when a change takes place from alternating to direct-current or vice versa, all of the electromagnetic switches which are in working order will swing over until they are caught and retained by the locking-pieces G'. If any electromagnetic switch is out of order or fails to act, they will move no farther than this until the defect is remedied; and should any of the electromagnetic-locks fail to act, the corresponding switch will be held in its middle position until after the reverse-change has taken place, and all of the other switches have again become locked. Therefore with this device a short-circuit caused by the failure of the switches to work together will be practically impossible.

An alternative form of this construction is shown in Fig. 4, in which the direct and alternating-current circuits $a'$ and $b'$, the lamp circuits L, the transformer T', and the connections designated by the same reference-numbers are unchanged, but a form of electromagnet E'' having a vertically moving armature $e^5$ similar to those shown in Figs. 1 and 2 is used. Said electromagnet E″ is connected across the direct-current circuit by the connections 25, 26 and 27 as before, but instead of the make-and-break I closing the circuit when attracted by the magnet $i$, a make-and-break I′ is used which opens when attracted by its magnet $i'$ and closes when released. A different form of switch S″ is substituted, said switch comprising a transverse contact-bar $s^9$ mounted on the lower end of the reciprocating-post $e^6$ which is secured to the armature $e^5$ and guided to move vertically; and the four terminals $s^{10}$, $s^{11}$, $s^{12}$ and $s^{13}$, the last two of which are connected together and to the lamp-circuit on the opposite side from the lead 22 by a lead 32. The terminals $s^{10}$, $s^{11}$ are connected respectively to the alternating-secondary and direct-current circuits by the leads 23 and 24. It will be obvious that the lower position of the armature $e^5$ and switch-bar $s^9$ corresponds to the alternating, and the upper position to the direct-current connection of the lamp-circuit; so that the energized condition of the device E″ corresponds in this case to the period during which direct current is supplied to the lamp-circuit. The interlocking-device is here constructed as follows:—A sliding bolt or locking-piece G″ is mounted to reciprocate in a line at right angles to the post $e^6$, and is caused by means of a spring $g^5$ to bear against the latter, and to enter a notch $e^7$ in the side of the post when it is in its central position. The armature $g^6$ of the releasing-magnet H″ is mounted on this bolt in a position to withdraw it from the notch $e^7$ when said magnet is energized, and said armature $g^6$ acts as a connecting-piece to electrically connect the terminals $g^7$, $g^8$ when the bolt is in its forward position, and to disconnect said terminals when it is drawn back. The lead 28 connects one pole of the battery-circuit to the terminal $g^7$ of the interlocking-device at one end of the series, and the lead 29 connects the other terminal $g^8$ to one pole of the magnet H″; the other terminal of said magnet is connected by the lead 30 to the terminal $g^7$ of the next interlocking-device; and so on to the last one, the magnet H″ of which is connected by the lead 31 to the other terminal of the battery, thus forming the same series-connection of the interlocking-device as hereinabove described. It will be seen that as the switches are thrown over by the action of the electromagnetic devices E″, they are locked as they reach their central position by the entrance of the bolts G″ into the notches $e^7$ thereof, and none of them can be unlocked until all of them are in said notches, at which time they are simultaneously unlocked; and in every respect the action is the same as in Fig. 3.

In Fig. 5 the construction and action are both effectively the same as in Fig. 4; but the connection by which the action is brought about is different. This connection may be described as a parallel connection of the interlocking-devices as contrasted with the series-connection of Figs. 2, 3 and 4. The terminals $g^7$ and $g^8$, which are normally disconnected and become connected by the locking-movement of the bolt, are in this case replaced by terminals $g^9$, $g^{10}$, which are so placed as to be normally connected together, and they are disposed so as to short-circuit the respective magnets H″ when so connected. The latter are not connected in series, but one terminal of each is connected directly by a lead 33 to one side of the battery-circuit, as for example to the lead 24, and the other terminal of each is connected to a lead 34 which extends through all of the interlocking-devices of the series, and is connected at some point through a resistance R with the other pole of the battery-circuit, as for example to the lead 22. It will be seen that so long as any of the bolts G″ are withdrawn, all of the releasing-magnets H″ are short-circuited through the terminals $g^9$, $g^{10}$ and armature $g^6$ of that one which is withdrawn, and therefore that only when all of them are thrown forward do the magnets H″ become energized. The resistance R is inserted to prevent short-circuiting of the battery-circuit. This method while practicable is considered in general less useful than the series-connection since it involves the continual use of some current to support the interlocking-devices, but it may be preferable in certain cases.

In the most improved form of our apparatus, shown in Fig. 6, we have aimed to obviate two disadvantages inherent in the apparatus as thus far described, though involving greater complexity. It may be obvious that in the forms of Figs. 2, 3, 4 and 5 continual use of the battery will be necessary in order to hold the switches in their alternating-current position, and should the battery be cut out, all the switches would go over to the direct-current side and the lights would be shut off. Moreover, there will be considerable waste of battery-current, assuming that the alternating-current is to be used for 12 to 18 hours a day. To avoid this we provide an automatic catch to sustain the switch in its elevated position, and at the same time cut off current from the electromagnet thereof. Two forms of each device are shown in Fig. 6. It will further be seen that, should one or more of the interlocking-devices lag behind the others in releasing, that is to say, fail to act promptly, the others will open the circuit and deënergize the switches which lag behind before they have had time to act, thus making it likely that if a considerable number of switches are on the circuit, one or more of them will fail to act at each reversal of the switch. To avoid this we provide means whereby the interlocking-devices are actuated for withdrawal individually and independently from supplementary circuits which are only closed by the interlocking-circuit and are opened by their own automatic action in withdrawing the locking-bolts. This improved device is also illustrated in Fig. 6. We have shown the two apparatuses of Fig. 6 in different positions, not because they would naturally be so, but in order to illustrate the two positions. The parts which are repeated without alteration from Figs. 4 and 5 are designated by the same reference-letters. On the left of Fig. 6 the place of the make-and-break I and magnet $i$ is taken by a magnet $i^2$ connected in shunt across the secondary of the transformer T' by leads 35 and 36, and its two movable armatures $i^3$ and $i^4$ both weighted to stand normally apart from the magnet, and adapted to make contacts, the former when it is closed with a terminal $i^5$, the latter when it is opened with a terminal $i^6$. The two make-and-breaks formed by the elements $i^3$, $i^5$, and $i^4$, $i^6$ are intercalated in series in the circuit of the electromagnetic-device E''; the course of the current, starting from the battery-lead 22, being through the lead 12, armature $i^3$, terminal $i^5$, lead 37, armature $i^4$, terminal $i^6$, lead 38, electromagnetic-device E'', and lead 25 to the opposite battery-lead 24. The device is completed by a lock-lever J, pivoted at $j'$, and connected by a link $j^2$ to the armature $i^4$. The free end of the lever J is adapted to engage in a notch $e^8$ in the side of the post $e^6$, which notch is so placed as to register with the end of the lever J when the post is in its raised position. The mode of operation is as follows: When the alternating-current is turned on to the transformer T', the switch S'' being down, the magnet $i^2$ is energized and thereby attracts the armature $i^3$, closing the break at $i^5$. The break at $i^6$ is not opened because the armature $i^4$ cannot be moved until the post $e^6$ has been raised, by reason of the engagement of the lever J with the side of the post $e^6$. The circuit of the electromagnet E'' is therefore closed, the latter energized so that it raises its armature to the top. At this point the end of the lever J is opposite the notch $e^8$ and is caused to enter the same by the attraction of the magnet $i^2$ upon its armature $i^4$, and the mechanical connection thereof with the lever J. By this movement the energizing-circuit of the electromagnet E'' is simultaneously broken at $i^6$, thereby cutting off the current. This condition of things continues so long as the magnet $i^2$ is energized, but when the alternating-current is discontinued the magnet $i^2$ drops its armature $i^4$, and the weight thereof disengages the lever J from the notch $e^8$, permitting the post $e^6$ to fall. At the same moment the circuit of the electromagnet E'' is opened at $i^5$, thus preventing the reënergizing of the same.

A different form of this device with only one armature is shown on the right of Fig. 6. In this case the magnet $i^7$ which replaces the magnet $i^2$ has only one armature $i^8$, which is mounted on the end of a rod $i^9$, the latter carrying or operating at its lower end a contact piece $i^{10}$. In this case the lever J', which replaces the lever J, is used as a conducting-element to connect electrically the contact-piece $i^{10}$ with a terminal $i^{11}$, but as will be seen both $i^{10}$ and $i^{11}$ are not simultaneously in contact with the lever J' under normal circumstances. The devices $i^{10}$, $i^{11}$ and J' are intercalated in the energizing-circuit of the electromagnetic-device E'', the terminal $i^{11}$ being connected directly to one battery-lead 22, and the contact-piece $i^{10}$ by a lead 39 to the electromagnetic-device E''. When the alternating-current is shut off, the contact-piece $i^{10}$ is below and out of contact with the lever J', consequently the energizing-circuit remains open until the alternating-current is turned on, which energizes the magnet $i^7$ and causes it to raise its armature $i^8$. At this time the energizing-circuit of the electromagnetic-device E'' is closed because the lever J' is held in contact with the terminal $i^{11}$ until the rising of the post $e^6$ to the top permits the end of said lever to engage with the notch $e^8$, at which moment the energizing circuit is broken at $i''$, and the post $e^6$ mechanically sustained as heretofore described. When the alternating-current is turned off, the armature $i^8$ drops, releasing the lever J' from engagemenet with the post $e^6$, and breaking the energizing-circuit at $i^{10}$. Our improved interlocking-device as illustrated in this figure is as follows: The place of the interlocking-magnet H'' is taken by two magnets H'''' and K, and the place of the locking-bolt G'' is taken by a bolt G''', which carries a spring or other device $g''$ for thrusting it automatically into the notch $e^7$, and the armature $g^{12}$, which is attracted by the magnet K to withdraw the bolt from such engagement. The armature $g^{12}$ carries or itself acts as a contact-piece to connect the two terminals $g^7$ and $g^8$, which are interposed in the interlocking-circuit 28, 29, 30, 31, the same as hereinabove described, in which interlocking-circuit are also inserted in series the several interlocking-magnets H'''. These interlocking-magnets operate upon independent armatures $m'$ which are mounted on reciprocating bolts M, and carry each a contact-piece $m^2$ which is adapted to unite two terminals $m^3$, $m^4$ disposed in the circuit 40, 41 and 42 of the magnet K, said circuit connecting each of said magnets K individually across the battery-circuit. The two bolts G''', M are arranged in line, and in a position to abut against each other when the bolt G''' is fully drawn back, as will be presently described; such insulation being of course provided for the conducting-members carried by said bolts as will prevent any current passing along them when they are in contact. The mode of operation is as follows: When all of the posts $e^6$ are in their central position, and all the bolts G''' have been moved into engagement with the notches $e^7$ by the springs $g''$, the interlocking-circuit through the elements 28, $g^7$, $g^{12}$, $g^8$, 29, H''', 30 ... 31 and 42 will be closed, and the releasing-magnets H''' therefore will attract their several armatures $m'$, thus severally closing the circuits of the retracting-magnets K across the terminals $m^3$, $m^4$. As soon as this takes place, said retracting-magnets will be energized, and by attracting their armatures $g^{10}$ will individually withdraw the bolts G''' from their several notches $e^7$, at the same time breaking the interlocking-circuit at $g^7$, $g^8$. The circuit of each retracting-magnet remains intact until its bolt is withdrawn a sufficient distance to release the post $e^6$; after which the bolt G''' continues to move back until by striking the end of the bolt M, the contact-piece $m^2$ is moved away from the terminals $m^3$, $m^4$, and the circuit of the retracting-magnet K thus broken. This action in turn releases the armature $g^{12}$, and the bolt G''' is driven forward again by the spring $g''$, but in the meantime the post $e^6$ having passed beyond its middle position, the bolt G''' rests against the side thereof ready for its next interlocking movement.

From the above description it will be readily seen that our invention is not limited to special forms and mechanical constructions such as we have hereinabove shown by way of illustration, but that the principles thereof are expressible in a variety of ways as will be well understood by electricians; therefore the scope of our claims is to be interpreted in view of such alternative constructions.

Having thus described our invention what we claim as new and desire to secure by Letters Patent is:

1. The combination of an alternating-current circuit, a direct-current circuit, a service-circuit, a switch adapted to connect said service-circuit with either of the other circuits alternatively, an electromagnetic-device for operating said switch, said electromagnetic-device being energized whenever current is turned into the alternating-current circuit and deënergized when there is no current therein, and said electromagnetic-device when energized acting to move said switch so as to connect said service-circuit with one of the other circuits and when deënergized with the other, and an electrically-operated device acting automatically to hold said switch in the position corresponding to the energized position of said electromagnetic device and simultaneously cut off current from the latter so long as there is current in said alternating-current circuit, and to release said switch when the alternating-current is shut off from said circuit.

2. The combination of an alternating-current circuit, a direct-current circuit, a service-circuit, a switch having two positions in one of which said service-circuit is connected with said alternating-current circuit, and in the other with said direct-current circuit, an electromagnetic-device operating said switch to shift it to one position or the other and acting when energized to move it into one of said positions and when deënergized into the other, a make-and-break intercalated in the energizing circuit of said electromagnetic-device, an electromagnetic-device connected up with said alternating-current circuit and operating said make-and-break, and a device arranged to mechanically engage and retain some part movable with the switch when the latter is in the position corresponding to the energized condition of said first-named electromagnetic-device and simultaneously to cut off current from the latter, said engaging-device being operated to move into, and being retained in its engaging position by the attraction of said second electromagnetic-device when energized, and being released therefrom when the latter is deënergized.

3. The combination of an alternating-current circuit, a direct-current circuit, a service-circuit, a switch having two positions in one of which said service-circuit is connected with said alternating-current circuit and in the other with said direct-current circuit, an electromagnetic-device operating said switch to shift it to one position or the other, and acting when energized to move it into one of said positions and when deënergized into the other, a second electromagnetic-device, a mechanical-device operated by the attraction of said electromagnetic-device and adapted to mechanically engage some part connected with said switch in the position corresponding to the energized condition of said first-named electromagnetic-device, and to hold it mechanically in said position, and two make-and-breaks operated by said second electromagnetic-device, and intercalated in series in the circuit of said first-named electromagnetic-device, one of said make-and-breaks being closed by the attraction of said second electromagnetic-device when the latter is energized, and opened when it is deënergized, and the other being closed when said mechanically-engaging device is in the disengaging position, and opened when it is in the engaging position.

4. The combination of an alternating-current circuit, a direct-current circuit, one or more service-circuits, a plurality of changeover-switches mechanically detached from each other and adapted to connect said service-circuits with either of the other circuits alternatively, electromagnetic-devices actuated from the alternating-current circuit and adapted when energized to move said switches to one side and when deënergized to move said switches to the other side, and a plurality of interlocking electrical devices connected up in joint electrical relation and governing electrically the movements of the respective switches; said interlocking-devices being adapted to prevent the shifting of any of said switches unless all are shifted simultaneously.

5. The combination of an alternating-current circuit, a direct-current circuit, one or more service-circuits, a plurality of changeover-switches having each two positions and connected with the service-circuits, so that in one position they connect the latter to the alternating-current circuit and in the other to the direct-current circuit, a plurality of electromagnetic devices operating the respective switches and connected in circuit with a source of electrical energy, a second set of electromagnetic devices permanently connected to the alternating-current circuit and each actuating a make-and-break intercalated in the circuit of one of said first-named electromagnetic devices, and a plurality of interlocking-electrical devices connected up in joint electrical relation and governing the movements of the respective switches; said interlocking-devices being adapted to prevent the shifting of any of said switches unless all are shifted simultaneously.

6. The combination of an alternating-current circuit, a direct-current circuit, one or more service-circuits, a plurality of changeover-switches having each two positions and connected with the service-circuits so that in one position they connect the latter to the alternating-current circuit and in the other to the direct-current circuit, a set of electromagnetic devices operating the respective switches and connected in circuit with a source of electrical energy, a set of make-and-breaks intercalated in the circuit of the respective electromagnetic devices, a second set of electromagnetic devices permanently connected to the alternating-current circuit and each actuating one of said make-and-breaks, a plurality of trip-devices normally disposed in the path of some part moving with said switches so as to prevent the shifting thereof, a plurality of electrically-operated retracting-devices adapted each to retract one of said trip-devices so as to permit the shifting of said switches, and an interlocking-circuit with which said retracting-devices are connected; said interlocking-circuit having make-and-break points which are operated to effect the retracting of said trip-devices by said retracting-devices when and only when all of said switches are moved to the position at which they are checked by said trips.

7. The combination of an alternating-current circuit, a direct-current circuit, one or more service-circuits, a plurality of changeover-switches having each two positions and connected with the service-circuits so that in one position they connect the latter to the alternating-current circuit and in the other to the direct-current circuit, a plurality of electromagnetic devices operating the respective switches and connected in circuit with a source of electrical energy, a set of make-and-breaks intercalated in the circuit of the respective electromagnetic devices, a second set of electromagnetic devices permanently connected to the alternating-current circuit and each actuating one of said make-and-breaks, a plurality of trip-devices normally disposed in the path of some part moving with said switches so as to check them when in an intermediate position, a plurality of retracting-devices adapted to withdraw the several trips to permit the completing of the shifting-movement of said switches, a plurality of make-and-breaks which are operated by the several switches and closed when the latter are in said intermediate position, and an interlocking-circuit containing in series all of said make-and-breaks and all of said retracting-devices, whereby said interlocking-circuit is closed and said retracting-devices all simultaneously energized when and only when all of said switches are in said intermediate position.

8. The combination of an alternating-current circuit, a direct-current circuit, one or more service-circuits, a plurality of changeover-switches having each two positions and connected with the service-circuits, so that in one position they connect the latter to the alternating-current circuit and in the other to the direct-current circuit, a plurality of electromagnetic devices operating the respective switches and connected in circuit with a source of electrical energy, a set of make-and-breaks intercalated in the circuit of the respective electromagnetic devices, a second set of electromagnetic devices permanently connected to the alternating-current circuit and each actuating one of said make-and-breaks, a plurality of locking-devices automatically locking said switches in an intermediate position whenever they are moved thereinto, said locking-devices holding said switches in said position until said locking-devices are withdrawn from engagement therewith, a plurality of electrically-actuated retracting devices adapted to cause said locking-devices to be withdrawn under certain electrical conditions, an interlocking-circuit with which all of said retracting-devices are connected, and means actuated by said switches when and only when they are all in said intermediate position for changing the electrical conditions of said interlocking-circuit so as to cause said retracting-devices to retract the several locking-devices and thereby free all of said switches simultaneously.

9. The combination of an alternating-current circuit, a direct-current circuit, and one or more service-circuits, a plurality of changeover-switches having each two positions and connected with the service-circuits so that in one position they connect the latter to the alternating-current circuit and in the other to the direct-current circuit, a plurality of electromagnetic devices operating the respective switches and connected in circuit with a source of electrical energy, a set of make-and-breaks intercalated in the circuit of the respective electromagnetic devices, a second set of electromagnetic devices permanently connected to the alternating-current circuit and each actuating one of said make-and-breaks, a plurality of locking-devices automatically locking said switches in an intermediate position whenever they are moved thereinto, said locking-devices holding said switches in said position until said locking-devices are withdrawn from engagement therewith, a plurality of electrically actuated retracting-devices adapted to cause said locking-devices to be withdrawn under certain electrical conditions, a plurality of electrically operated releasing-devices adapted to be actuated to bring about such conditions, an interlocking-circuit with which all of said releasing-devices are connected, and make-and-break devices operated by the movements of said switches and connected with said interlocking circuit so as to cause said releasing-devices to be actuated when and only when all of said switches are in their intermediate position.

10. The combination of an alternating-current circuit, a direct-current circuit, one or more service-circuits, a plurality of changeover-switches having each two positions and connected with the service-circuits so that in one position they connect the latter to the alternating-current circuit and in the other to the direct-current circuit, a plurality of electromagnetic devices operating the respective switches and connected in the circuit with a source of electrical energy, a set of make-and-breaks intercalated in the circuit of the respective electromagnetic devices, a second set of electromagnetic devices permanently connected to the alternating-current circuit and each actuating one of said make-and-breaks, a plurality of locking-devices automatically locking said switches in an intermediate position whenever they are moved thereinto, said locking-devices holding said switches in said position until said locking-devices are withdrawn from engagement therewith, a plurality of electrically actuated retracting devices adapted to cause said locking-devices to be withdrawn under certain electrical conditions, a plurality of electrically operated releasing-devices adapted to be actuated to bring about such conditions, an interlocking-circuit with which all of said releasing-devices are connected, and make-and-break devices operated by the movements of said switches and connected with said interlocking circuit so as to cause said releasing-devices to be actuated when and only when all of said switches are in their intermediate position; said locking-devices being arranged so as after having fully released said switches to mechanically act upon said releasing-devices, and thereby break off the conditions which cause said locking-devices to be retracted.

11. The combination of an alternating-current circuit, a direct-current circuit, one or more service-circuits, a plurality of changeover-switches having each two positions and connected with the service-circuits so that in one position they connect the latter to the alternating-current circuit and in the other to the direct-current circuit, a plurality of electromagnetic devices operating the respective switches and connected in circuit with a source of electrical energy, a set of make-and-breaks intercalated in the circuit of the respective electromagnetic devices, a second set of electromagntic-devices permanently connected to the alternating-current circuit and each actuating one of said make-and-breaks, a second set of electromagnetic devices permanently connected to the alternating-current circuit and each actuating one of said make-and-breaks, a plurality of locking-devices by which said switches are respectively automatically engaged and held as they shift when in their intermediate positions, a plurality of electrically operated retracting-devices adapted to retract said locking-devices when energized, means for independently energizing the several retracting-devices, a plurality of make-and-break devices inserted in the circuits of the several releasing-devices so that the latter are energized when said make-and-break devices are closed and deënergized when they are open, a plurality of electrically operated releasing-devices adapted to close said make-and-breaks when energized, a second set of make-and-breaks each of which is closed by one of said locking-devices when in the locking-position and opened when retracted, and an interlocking-circuit containing all of said second set of make-and-breaks and all of said releasing-devices in series whereby the latter are energized to close said first set of make-and-breaks and thereby energize the retracting-devices only when all of said switches are in their intermediate positions.

12. The combination of an alternating-current circuit, a direct-current circuit, one or more service-circuits, a plurality of changeover-switches having each two positions and connected with the service-circuits so that in one position they connect the latter to the alternating-current circuit and in the other to the direct-current circuit, a plurality of electromagnetic-devices operating the respective switches and connected in circuit with a source of electrical energy, a set of make-and-breaks intercalated in the circuit of the respective electromagnetic devices, a second set of electromagnetic devices permanently connected to the alternating-current circuit and each actuating one of said make-and-breaks, a plurality of locking-devices by which said switches are respectively automatically engaged and held as they shift when in their intermediate positions, a plurality of electrically operated retracting-devices adapted to retract said locking-devices when energized, means for independently energizing the several retracting-devices, a plurality of make-and-break devices inserted in the circuits of the several releasing-devices so that the latter are energized when said make-and-break devices are closed and deënergized when they are open, a plurality of electrically operated releasing-devices adapted to close said make-and-breaks when energized, a second set of make-and-breaks each of which is closed by one of said locking-devices when in the locking-position and opened when retracted, and an interlocking-circuit containing all of said second set of make-and-breaks and all of said releasing-devices in series whereby the latter are energized to close said first set of make-and-breaks and thereby energize the retracting-devices only when all of said switches are in their intermediate positions; said locking-devices being arranged in their attracting movements after they have completely released said switches to mechanically act upon said first set of make-and-breaks so as to open the same, thereby again releasing said locking-devices and permitting them to take up a position ready for locking said switches when the latter shall again come into their intermediate positions.

13. The combination of an alternating-current circuit, a direct-current circuit, one or more branch-circuits, a plurality of switches each having two positions in one of which said service-circuits are connected with said alternating-current circuit and in the other with said direct-current circuit, a set of electromagnetic devices operating said switches to shift them into one position or the other and acting when energized to move them into one of said positions and when deënergized into the other, a second set of electromagnetic devices, a set of mechanical-devices operated by the attraction of the respective electromagnetic devices of the second set and associated with the respective switches and adapted to mechanically engage some part connected with the latter in the position corresponding to the energized condition of the first-named set of electromagnetic-devices to hold them mechanically in said position, a set of make-and-breaks associated by pairs with the respective electromagnetic devices of the second set and operated thereby, each pair being intercalated in series in the circuit of the corresponding electromagnetic device of the first set, one of each pair being closed by the attraction of the electromagnetic device of the second set when the latter is energized and opened when it is deënergized, and the other being closed when said mechanically engaging device is in the disengaging position, and opened when it is in the engaging position; a plurality of locking-devices by which said switches are respectively automatically engaged and held as they shift when in their intermediate positions, a plurality of electrically operated retracting-devices adapted to retract said locking-devices when energized, means for independently energizing the several retracting-devices, a plurality of make-and-break devices inserted in the circuits of the several retracting-devices so that the latter are energized when said make-and-break devices are closed and deënergized when they are open, a plurality of electrically operated releasing-devices adapted to close said make-and-breaks when energized, a second set of make-and-breaks each of which is closed by one of said locking-devices when in the locking-position and opened when retracted, and an interlocking-circuit containing all of said second set of make-and-breaks and all of said releasing-devices in series whereby the latter are energized to close said first set of make-and-breaks and thereby energize the retracting-devices only when all of said switches are in their intermediate positions.

In witness whereof we have hereunto set our hands in presence of two witnesses.

JULIUS H. GUGLER.
GEORGE W. COLLES.

Witnesses:
HARRY J. MILTON,
JAS. C. PETERSON.